No. 862,256.
PATENTED AUG. 6, 1907.
J. F. KELLER & W. A. WARMAN.
MACHINE FOR ENGRAVING OR SINKING DIES.
APPLICATION FILED NOV. 5, 1904.
12 SHEETS—SHEET 1.

Fig. 1.

Witnesses
Inventors
Joseph F. Keller
William A. Warman
By their Attorney
George Cook.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

No. 862,256. PATENTED AUG. 6, 1907.
J. F. KELLER & W. A. WARMAN.
MACHINE FOR ENGRAVING OR SINKING DIES.
APPLICATION FILED NOV. 5, 1904.

UNITED STATES PATENT OFFICE.

JOSEPH F. KELLER AND WILLIAM A. WARMAN, OF NEW YORK, N. Y.

MACHINE FOR ENGRAVING OR SINKING DIES.

No. 862,256.　　　　Specification of Letters Patent.　　　　Patented Aug. 6, 1907.

Application filed November 5, 1904. Serial No. 231,500.

*To all whom it may concern:*

Be it known that we, JOSEPH F. KELLER and WILLIAM A. WARMAN, citizens of the United States, and residents of New York city, boroughs of Manhattan and the Bronx, respectively, in the county of New York and State of New York, have made and invented certain new and useful Improvements in Machines for Engraving or Sinking Dies, of which the following is a specification.

Our invention relates to an improvement in machines for engraving or sinking dies, the object being to simplify machines now in use and employed for the same purpose, and to render it automatic in its several adjustments, especially the variations of the speed at which the model or pattern and the die are caused to rotate or oscillate as the latter approaches completion, and also the feed of the tracer and cutting tool along the surfaces of the pattern and die, respectively.

With these and other ends in view, the invention consists in certain novel features of construction and combinations of parts, as will be hereinafter fully described and pointed out in the claims.

In the accompanying drawings

Our improved machine is designed to exactly reproduce in outline and configuration a die from a given pattern or templet, said pattern and die being caused to simultaneously rotate or oscillate in front of a tracer and cutting tool respectively, mounted upon a rod or bar adapted to carry said tracer and cutting tool across the faces of the pattern and die.

Referring to the drawings 30 represents the base or frame of the machine, upon which is mounted the operative mechanism hereinafter referred to, and to the top or upper side of which are secured the bearings 31, 32 and 33, in which is journaled the shaft 34, the latter being adapted, as hereinafter described, to simultaneously rotate or oscillate the pattern and die holders. While it is evident that motion may be transmitted to the shaft 34 from any suitable source, conveniently located, yet we prefer, as illustrated in the drawings, to employ an electric motor 35 of any suitable design or construction, (that illustrated in Fig. 27 being compound wound), secured to the frame or base 30, and by means of the bevel gear 36, rod 37 and mechanism secured to the shaft 34, impart the necessary motion to the latter. As through this shaft 34, motion is imparted to the pattern and die, secured to their respective holders, it is desirable that means be provided whereby the rate of speed at which it travels may be gradually reduced as the tracer and cutting tool are fed across the faces of the pattern and die respectively, from the center toward the outer edge. This arises from the fact that the rotation or oscillation of the pattern and die at the centers travel at a much lower rate of speed than the outer edges thereof; that is, those portions near the center will travel in a given length of time, a much shorter arc-shaped path than those portions near the circumference, so that the pattern and die may be caused to rotate or oscillate at a much greater rate of speed in starting the work when the tracer and cutting tool are near the centers of the pattern and work, than when nearer completion, or at the time when the tracer and cutting tool are nearer the outer edges of the pattern and die. Should the same rate of speed be continued from the beginning to the finishing of the work, the pattern and die would pass too rapidly in front of the tracer as the cutter approached the periphery of the work. In order, therefore to allow the tracer and cutting tool to properly perform their functions, as they are fed along the surfaces or faces of the pattern and die in a direction from the center toward the outer edge, it becomes desirable to gradually decrease the speed at which said pattern and die oscillate or rotate, and to accomplish this, we employ a rheostat of any desired type or form, which, as will be hereinafter described, operates to gradually cut in such resistance as will slow down the speed of the electric motor 35.

Figures 5, 6, 7:
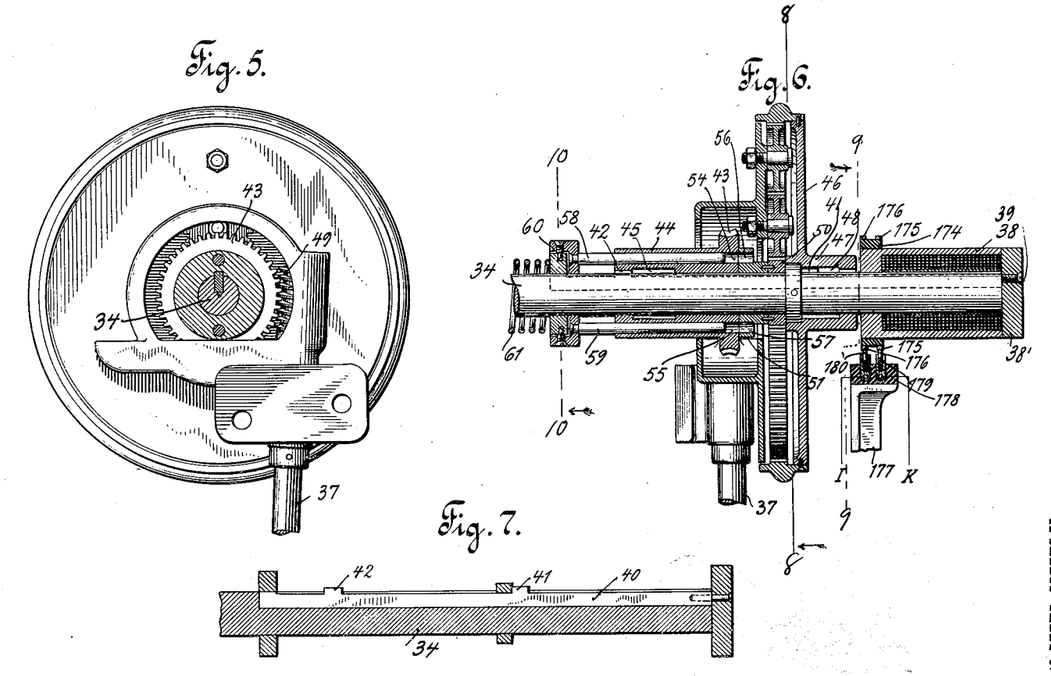
Figs. 5, 6, 7, 8, 9 and 10 are detail views of the devices for the transmission of motion to the pattern and die.

On the extreme end of the shaft 34 is located a magnet 38, to the armature $38^1$ of which is secured, by means of the screw 39, one end of the key 40, the latter fitting and sliding within a slot or recess formed in the shaft 34 to contain it, said sliding key being provided with the lugs 41—42, as clearly illustrated in Fig. 7 of the drawings. On the shaft 34 is also loosely mounted the gear 43 formed on the sleeve 44, the latter being provided with a recess 45 into which the lug 42 slides when the key 40 is forced outwardly by the spring 61, said lug 42 engaging the end of the sleeve 44 when the key is in position, as shown in Fig. 6. On the shaft 34 is also loosely mounted the internal gear 46 provided with the hub or sleeve 47, the latter being provided with a recess 48 in which the lug 41 fits when the parts are in the relative positions, as indicated in Fig. 6, that is, when the lug 42 is engaging with the end of the sleeve 44, which lug 41 engages with the end of the sleeve 47 when the key 40 is forced outwardly, and at which time the lug 42 will enter the recess 45 in the sleeve 44. From this description it will be understood that when the armature $38^1$ occupies the position as indicated in Fig. 6, that is, with the armature $38^1$ of the magnet resting against the outer end of the shaft 34, the lug 42 on the key 40 will engage with the end of the sleeve 44, thereby causing the gear 43 to revolve with the shaft, and allowing the internal gear 46 to remain idle. When, however, the armature $38^1$ is forced outwardly by means hereinafter described, carrying with it the attached key, the lug 42 will enter the recess 45 in the sleeve 44. At the same time the lug 41 on the key 40 will engage with the end of the hub or sleeve 47, thereby causing the internal gear 46 to revolve with the shaft 34.

Figure 8:
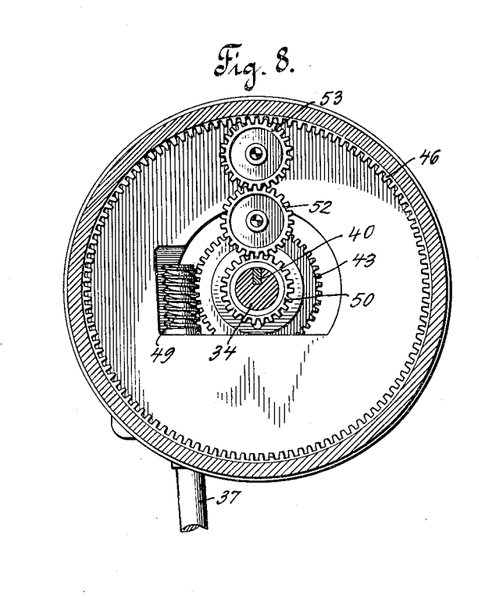
Figure 9:
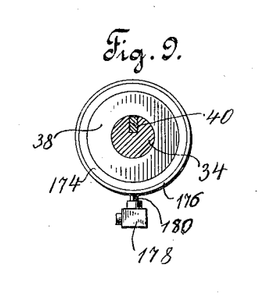
Figure 10:
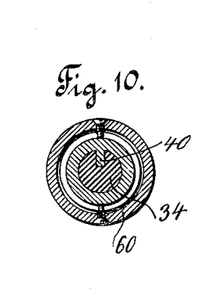
Figure 11:
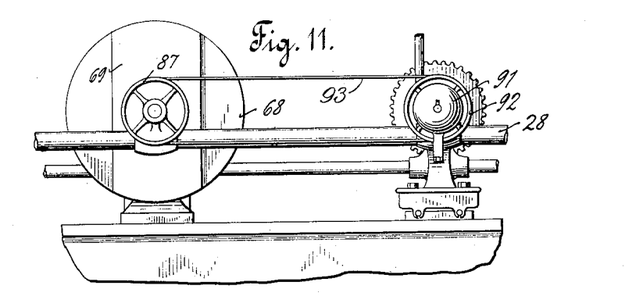
Figs. 11, 12 and 13 are deatil views showing the revolving tracer and means for imparting motion thereto.
Figure 12:
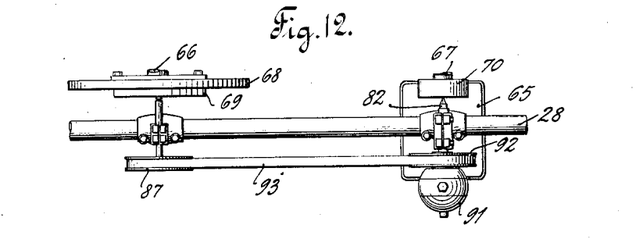
Figure 13:
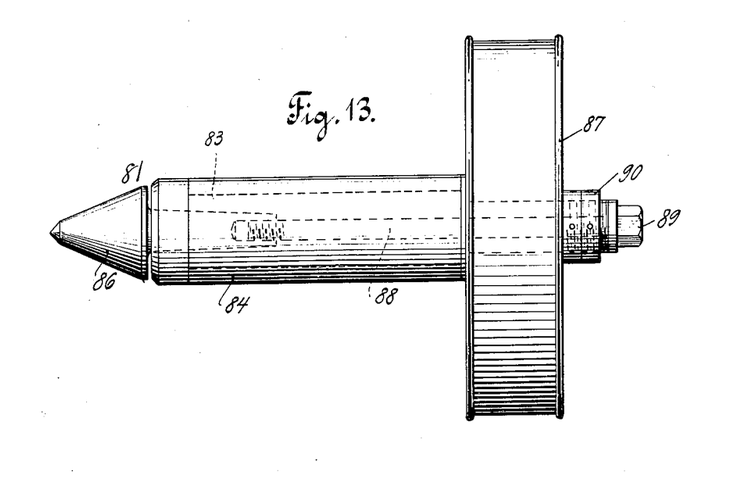
Figure 14:
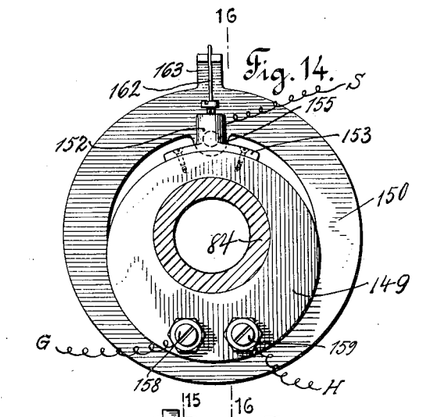
Figs. 14, 15, 16, 17, 18 and 19 are detail views of the switch for changing the direction of travel of the pattern and die, Fig. 15 being a sectional view taken on the line 15—15 of Fig. 16, and Fig. 16 a sectional view on the line 16—16 of Fig. 14.

As illustrated in Figs. 5 and 8 of the drawings, the upper end of the rod or shaft 37 is provided with the worm gear 49 which meshes with the gear 43, through which it transmits motion to the shaft 34 when the parts are in the relative positions, as indicated in Fig. 6, that is, when the lug 42 engages with the end of the sleeve 44 and drives said shaft at a comparatively high speed. On the shaft 34 is also mounted the gear 50 keyed to the sleeve 51, and which gear 50 meshes with the gear 52, the latter meshing with the gear 53 which latter in turn meshes with the internal gear 46, as illustrated in Figs. 6 and 8. In the sleeve 44 are formed openings 54—55 adapted to receive the rods 58—59, the outer ends of which are secured to the sleeve 60 also mounted on the shaft 34, against which latter sleeve bears one end of the spring 61, the opposite end of the spring bearing against a collar 62 secured tightly to the shaft 34, the tension of the spring operating to force outwardly the sleeve 60 toward the end of the shaft 34.

From the foregoing description it will be understood that when the magnet 38 is excited, the armature $38^1$ will be drawn to and hug tightly the end of the shaft 34, as illustrated in Fig. 6, and compressing the spring 61; when, however, the circuit is broken and the magnet 38 becomes passive, the spring 61 will operate to force outwardly the sleeve 60 carrying with it the key 40 until the lug 42 enters the recess 45 and causing the lug 41 to engage with the end of the hub or sleeve 47, the internal gear 46 being also keyed to the shaft by reason of the lug 41 engaging with the end of the hub or sleeve 47. Through the gears 52—53 motion is imparted from the rod 37 and is transmitted to the internal gear 46, which as before described being keyed to the shaft, imparts motion to the latter, but at a much lower speed than in the first instance, that is, the gear 43 is locked to the shaft by means of the lug 42 engaging with the end of the sleeve 44. In other words, when the magnet 38 is excited, the shaft 34 will travel at a high speed, and when passive, the train of gears described will cause it to travel at a lower rate of speed.

The brackets 32, 33 are provided with suitable bearings in which are mounted the spindles 66—67, the forward end of the spindle 66 being adapted to carry the pattern holder 68, which in turn carries the pattern 69, and the spindle 67 adapted to carry the die blank or work holder 70. On the spindle 66 is also tightly mounted the gear 71 meshing with the worm 72 secured to the shaft 34, and on the spindle 67 is mounted the gear 73 meshing with the worm 74, also secured to the shaft 34, whereby motion is imparted from said shaft 34 to the spindles 66—67, and to the pattern and work attached thereto, respectively.

To the bed of the machine is adjustably secured the bracket 75 formed with the bearing 76, in which is mounted the shaft 77, said shaft having pivoted to the forward end thereof the sleeve 78 through which latter passes the rod 79, which by reason of the shaft 77 turning in the bearing 76, is allowed a vertical movement, and by reason of the pivotal connection at 80, is allowed a movement in a direction toward and away from the faces of the pattern and die holders. Upon the rod 79 is mounted a tracer 81, so placed as to allow one end to come in contact with the pattern 69, and upon the said rod 79 is mounted a cutting tool 82, adapted to come in contact with the die blank or work mounted upon the holder 70, the free end of said rod 79 being gradually lowered, as hereinafter described, in order that the tracer and cutting tool may be fed across the faces of the pattern and die blank, respectively.

The tracer 81 preferably consists of a spindle 83, adapted to rotate within the sleeve 84 clamped in the bracket 85 secured to the rod 79, which spindle has secured thereto at one end, the conical tracing point 86, and near its opposite end the pulley 87, a rod 88 passing through the spindle and threaded at one end into the tracing point 86, its opposite end having the hexagonal head 89. The nuts 90 threaded onto the spindle bear against said pulley 87 and hold the same against the sleeve 84.

On the outer end of the spindle 82, the inner end of which is formed or provided with a cutting point, is mounted an electric motor 91 for rotating said cutting tool or spindle, and on said spindle is also mounted the pulley 92, around which passes the belt 93, the latter also passing around the pulley 87 secured to the tracer, whereby the latter is given a rotary movement to facilitate its travel over the uneven surface of the pattern 69.

To support the free end of the rod or bar 79, there is formed on the frame of the machine the bracket 94, the upper and lower ends of which are formed into sleeves 95, 96, in which is mounted the rod 97 provided with suitable shoulders or collars 98 for bearing against the upper sleeve to hold it in its proper position, the extreme upper end of the rod being provided with the hand wheel 99 to facilitate the turning of the same. To assist in holding the rod in its proper position, the sleeves 100 and 101 may also be formed on the bracket 94, and a collar 102 secured to the rod 97 for bearing against the sleeve 100. As illustrated in the several views of the drawings, the rod 97 is threaded for a portion of its length, said threaded portion passing through the bracket 103, one face 104 of the bracket resting against the stationary bracket 94, a roller 105 being pivotally secured between the outer end of the arm 103 and face 104 to act as a support for the free end of the rod or bar 79, which free end is provided with a downwardly extending arm 106 carrying the roller 107 bearing directly on the roller 105, the said rollers being employed to minimize as far as possible any friction of the outer end of the bar or rod 79 on its support, as they are raised and lowered, and as the bar is caused to be moved toward and away from the faces of the pattern and die, as hereinafter described.

Figure 1:
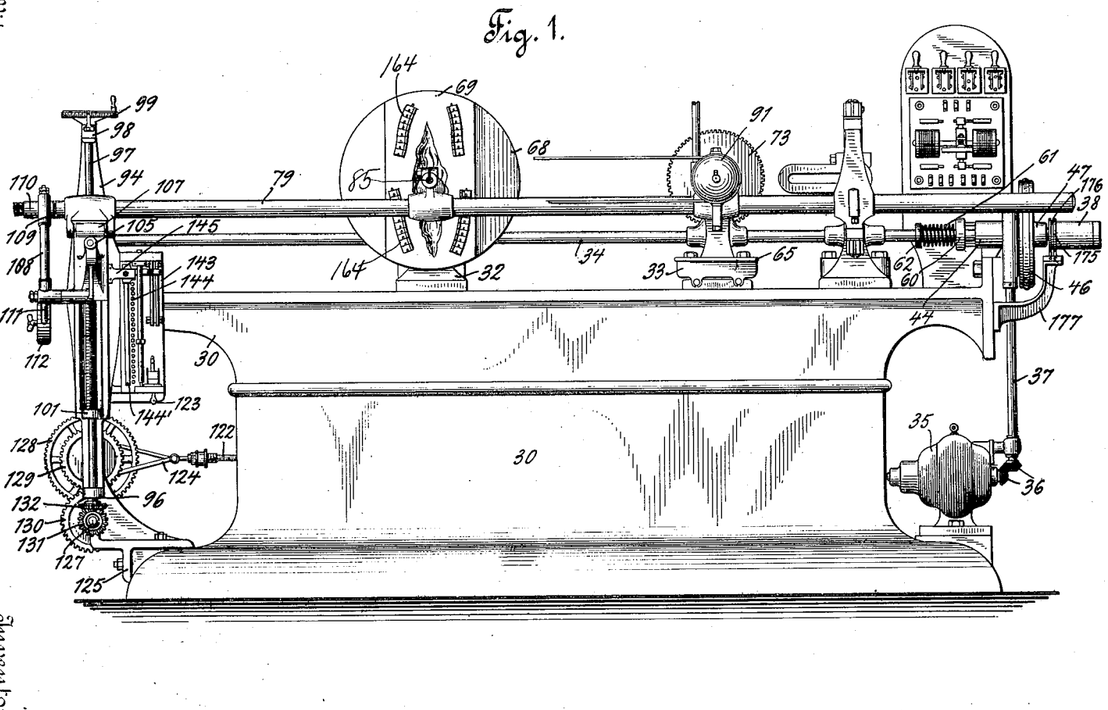
Figure 1 is a view in front elevation of my improved machine.
Figure 2:
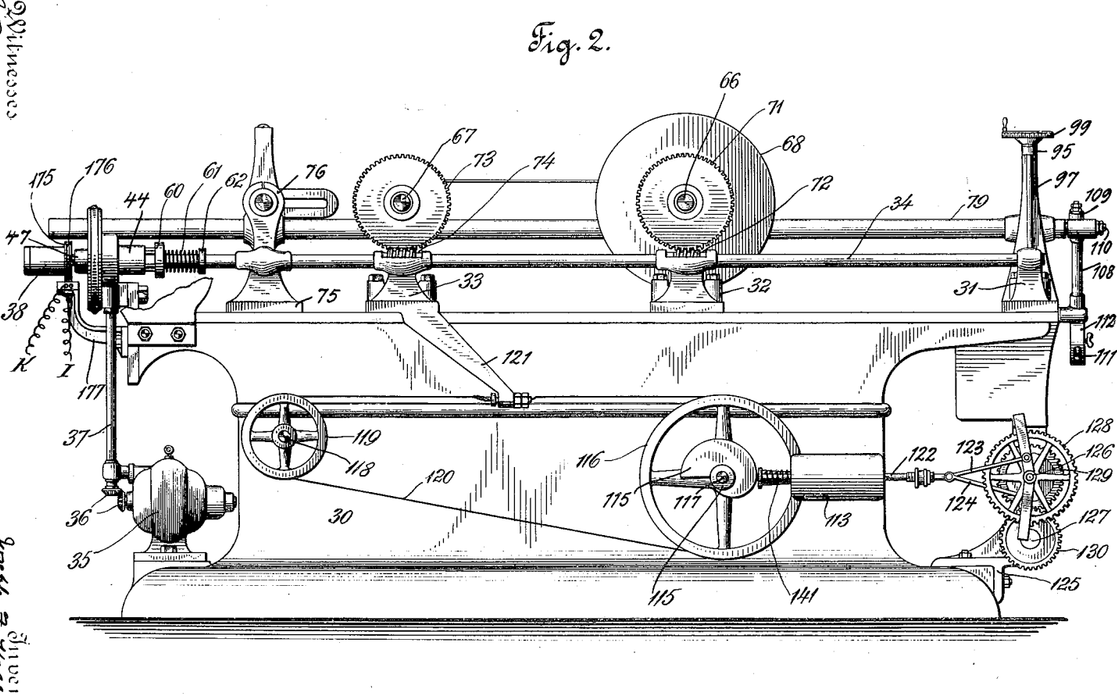
Fig. 2 is a view in rear elevation thereof.
Figures 20, 21, 22, 23:
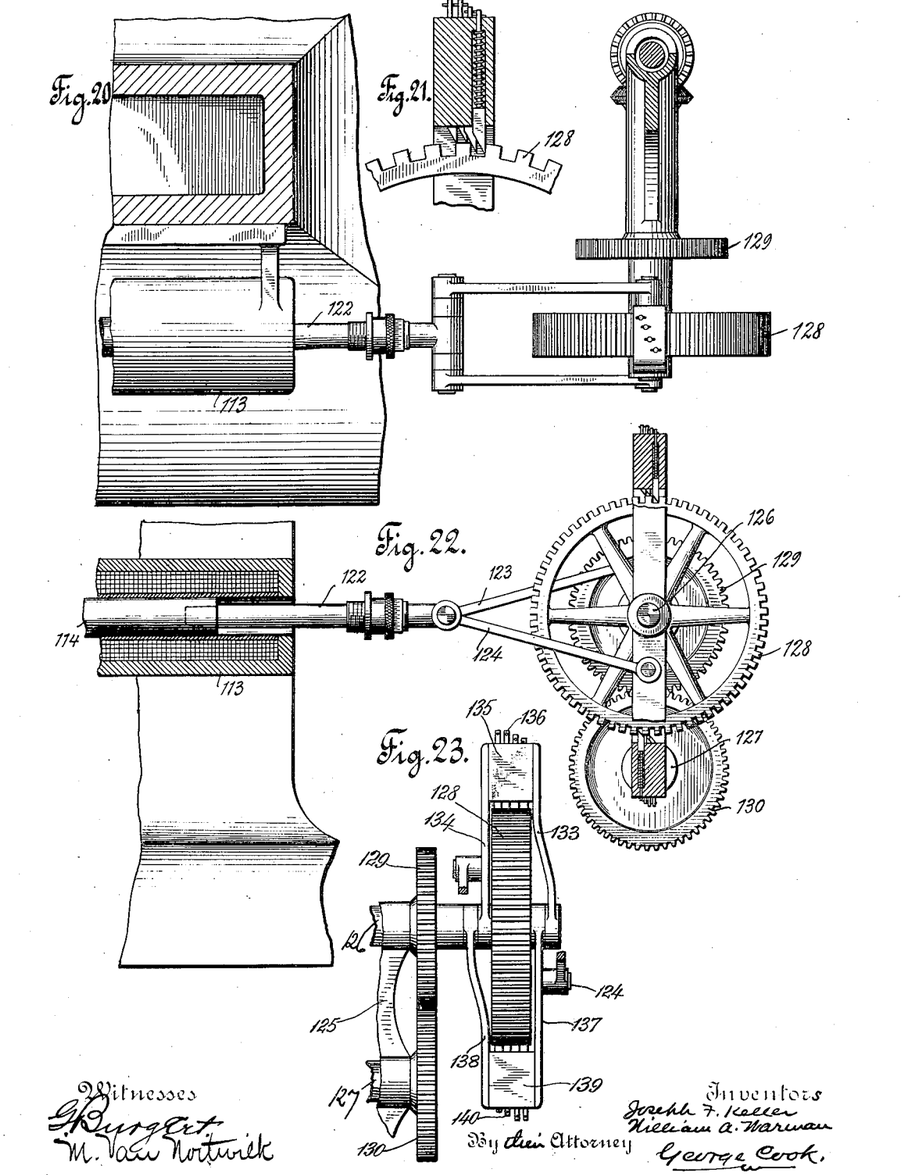
Figs. 20, 21, 22 and 23 are detail views showing the mechanism for regulating the feed of the bar carrying the tracer and cutting tool, Fig. 20 being taken on the line 20—20 of Fig. 4.
Figures 24, 25, 26:
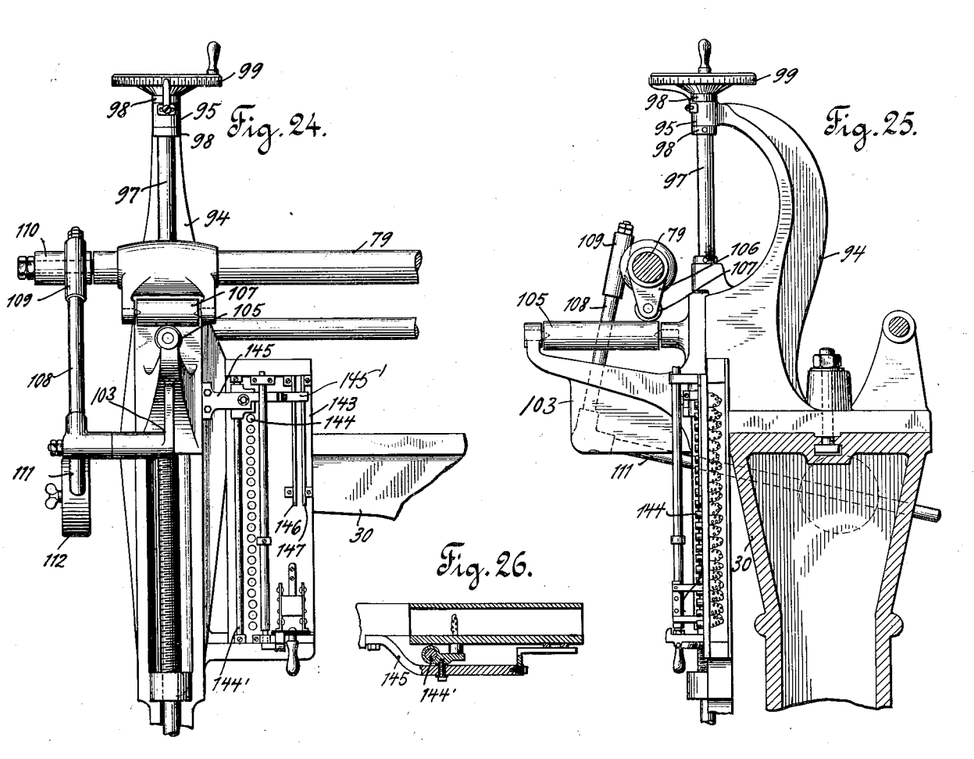
Figs. 24, 25 and 26 are detail views showing a portion of the mechanism for regulating the speed at which the pattern and die are caused to rotate or oscillate.

In order to keep the tracing tool, mounted on the rod or bar 79, in contact with the uneven surface of the pattern, and also the cutting tool mounted on the same bar, in contact with the die blank, we pivot to the bracket 103 a bell crank, the upper end of the vertical arm 108 of which is provided with a roller 109 bearing against the extreme outer end of the bar 79, also provided with a roller 110, the horizontal arm 111 having adjustably secured thereon the weight 112, the tendency of the weight being to carry downwardly the arm 111 and to carry inwardly the arm 108, which bearing against the rod or bar 79, as described, effectively retains the tracing and cutting tools in contact with the pattern and die respectively.
In the operation of a machine of this character, the several parts are so adjusted as to start or commence the cutting operation at the center of the die, the pattern and die being caused to rotate in front of the tracer and cutting tools, respectively, the bar carrying said tools being gradually lowered so that the tools may travel or feed in a direction from the center toward the periphery of the pattern and die. To thus gradually and automatically lower the bar 79, we secure to the frame of the machine a solenoid 113, having a rod or core 114, one end of the latter resting against the snail cam 115 formed on or secured to the hub of the disk or wheel 116, the latter being adapted to rotate on the shaft 117 secured to the frame of the machine as shown in Figs. 2, 20 and 22. To the frame of the machine is also secured one end of the shaft 118, on which is mounted the disk or wheel 119, and around which disk passes a band or wire 120, the latter also passing around the disk or wheel 116, as illustrated in Fig. 2 of the drawings. To this band or wire 120, is secured one end of the arm 121, the opposite end of said arm being secured to or formed integral with the bracket 33 carrying the die blank or work holder. The opposite end of the core 114 has secured thereto one end of the rod 122, the outer end thereof having pivoted thereto the connecting rods 123, 124.

To the bed of the machine is secured a bracket 125, in which are mounted the shafts 126 and 127, the former having keyed thereto as illustrated in Fig. 23, the ratchet wheel 128 and gear 129, the latter, that is, the shaft 127, having keyed thereto the gear 130, meshing with the gear 129, said shaft 127 also having secured thereto at its opposite end, the bevel gear 131, meshing with the bevel gear 132 secured to the lower end of the rod 97, it being understood from the foregoing description that when the ratchet wheel 128 is rotated, it will also rotate the gear 129, which in turn rotates the gear 130 and the bevel gear 131. Through the latter the bevel gear 132 is also rotated, which in turn rotates the rod 97, which rod having threaded thereon the bracket 103, will, when turned in a certain direction, lower said bracket and the free end of the rod or bar 79 resting thereon, and when turned in the opposite direction by the hand wheel 99, will raise said bracket 103 and rod 79.

In order to rotate the ratchet wheel 128, there are loosely mounted on the shaft 126, the ends of the arms 133 and 134, (Fig. 23), which between the outer ends thereof have secured the block 135, containing a series of spring actuated pawls 136, the pawls being preferably four in number, and located one slightly in advance of the other. On the shaft 126 are also loosely mounted the ends of the arms 137 and 138, the outer ends thereof having secured between them a block 139 containing a series of spring actuated pawls 140, preferably four in number, and located one slightly in advance of the other, as in the former instance, these two series of pawls in effect dividing each tooth of the ratchet wheel 128 into four parts, that is, the ratchet wheel may be moved one-fourth of the distance in order to engage with a pawl which it would be necessary to move in case but one pawl be used to operate the same.

To the arm 137 we secure the outer end of the connecting rod 124, and to the arm 134 we secure the outer end of the connecting rod 123, the effect being that when the solenoid 113 is excited and the core 114 drawn inwardly into the same, the rod 122 is advanced in the direction toward the ratchet wheel 128. By means of the connecting rod 123 and the pawls 136, the ratchet wheel 128 is caused to rotate, the distance traveled depending, of course, upon the length of the stroke of the core 114. At the same time the pawls 140 are caused to slide over the teeth of the ratchet wheel 128. When the circuit is broken and the solenoid 113 becomes passive, the core 114 is returned to its normal position by means of the spring 141 coiled around one end of said core and bearing at one end against the solenoid 113 and the opposite end against a collar 142 secured to said core, the extreme end of which core in its normal position, bears against the snail cam 115. As the core returns to its normal position, the ratchet wheel 128 is again rotated by means of the pawls 140, the pawls 136 at the same time sliding over the teeth of the ratchet wheel. It will thus be seen that at each inward and outward stroke of the core 113, or in other words, at each make and break of the circuit through the solenoid, the ratchet wheel 128 is rotated a predetermined distance, thereby lowering the free end of the bar 79 and feeding the tracer and cutting tool across the faces of the pattern and die respectively.

It will be understood that the length of the stroke of the core 114 and the consequent partial rotation of the ratchet wheel 128, is governed by the snail cam 115, against which one end of the core 114 rests when the solenoid is passive. Should the cam 115 be in such position as to allow the spring 141 to force the core backwardly a great length, the several arms with the pawls attached thereto will be pulled toward the solenoid the corresponding distance and over a certain number of teeth, and on the outward stroke will rotate the ratchet wheel a corresponding distance. If, however, the cam be turned so that the core 114 is held within the solenoid a greater distance, the length of stroke of said core is correspondingly shorter and the ratchet wheel 128 moved but a short distance. By connecting, however, the work holder with the wire 120, as before described, which passes around the wheel 116 carrying the snail cam 115, the said cam is always set or adjusted for the proper length of stroke of the core, for it will be understood that by moving the work holder in a direction toward the pivotal connection of the bar 79, the disk or wheel 116 will be rotated through the medium of the arm 121 and wire 120, bringing the cam into position to give a longer stroke to the core, and when said work holder is moved in the opposite direction, the wheel and cam will be rotated in an opposite direction, whereby to allow the core a longer stroke, so that the cam is always set or adjusted to its proper position, in accordance with the location of the work holder. This relation of the adjustments of the several parts arises, of course, from the fact that in order to feed the cutting tool, which is adjusted on the bar 79 opposite the work, a certain distance downwardly, the outer free end of the pivoted bar 79 must be dropped or lowered a greater distance when said work and cutting tool are located near the pivotal connection of said bar 79 than when located at a greater distance therefrom, as of course the arc traveled by the extreme outer free end of the pivoted bar 79 is greater than the arc traveled by any portion of the rod or bar nearer the pivoted end thereof. In other words, if it is desired to lower or feed the cutting tool carried on the bar 79 a certain predetermined distance, the outer end of said bar will have to be lowered a much greater distance when the cutting tool is near the pivoted end of said bar than when said cutting tool is nearer to the outer free end of said bar.

By means hereinafter described, at every revolution or oscillation of the pattern and die, the solenoid 113 is excited, the effect being that through the several gears with which the core 114 is indirectly connected, the rod 97 is given a partial turn and the bracket 103 supporting the free end of the rod or bar 79 allows the latter to feed downwardly carrying with it the attached tracer and cutting tool, the regulation of the feed being accomplished by the position of the snail cam 115, which as before described, determines the length of stroke made by the core 114 of the solenoid 113.

Figure 3:
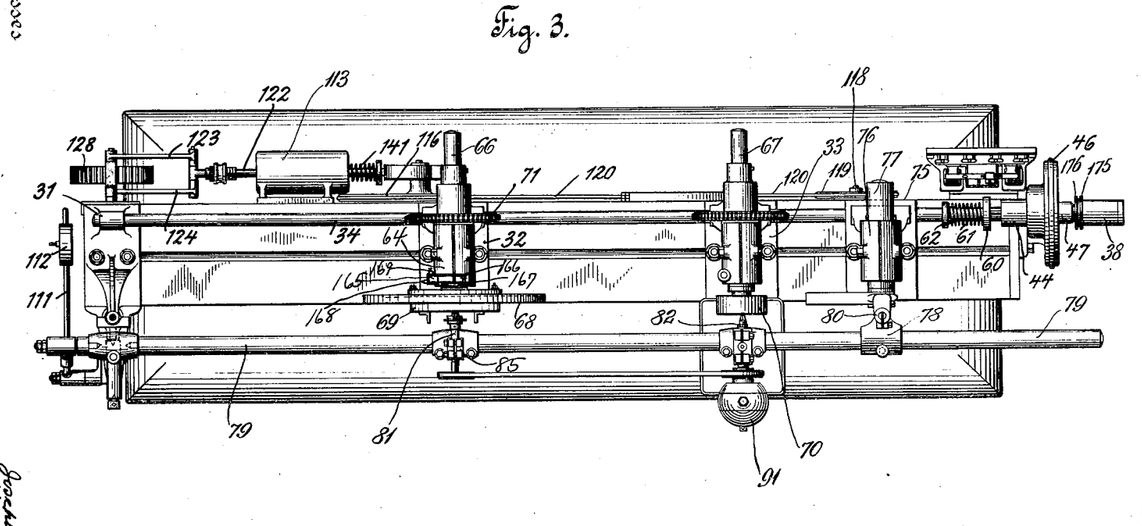
Fig. 3 is a top plan view of the same.
Figure 4:
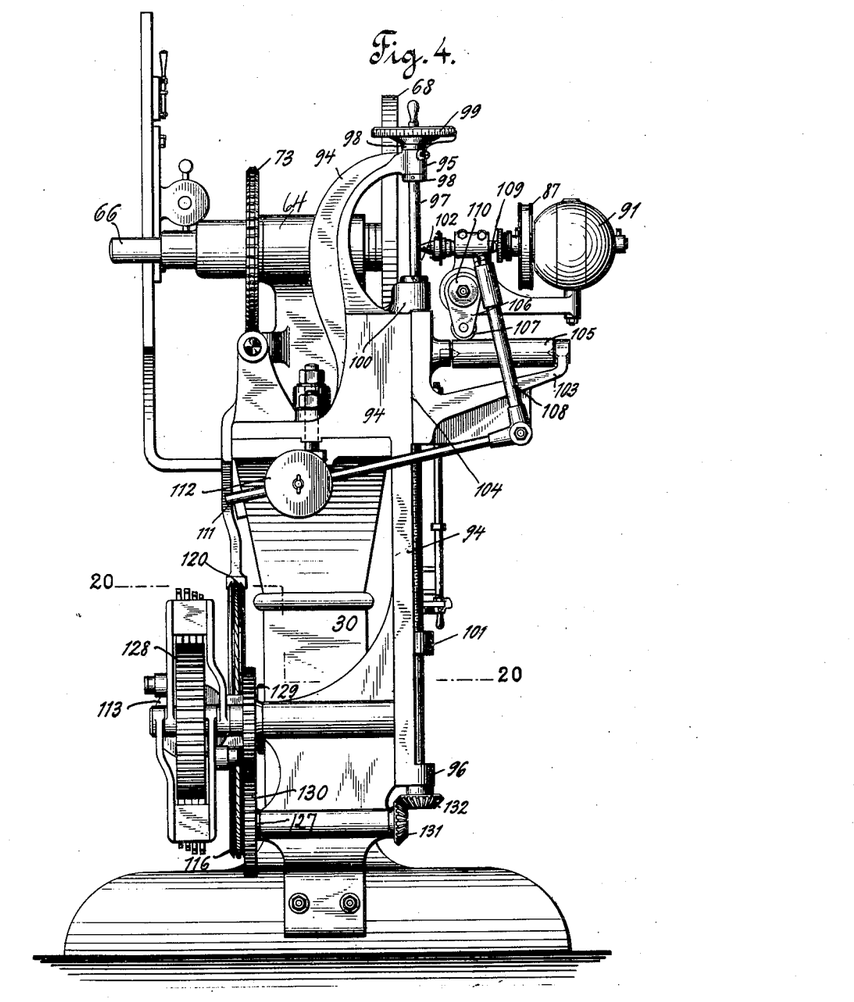
Fig. 4 is an end view of the machine.
Figure 19:
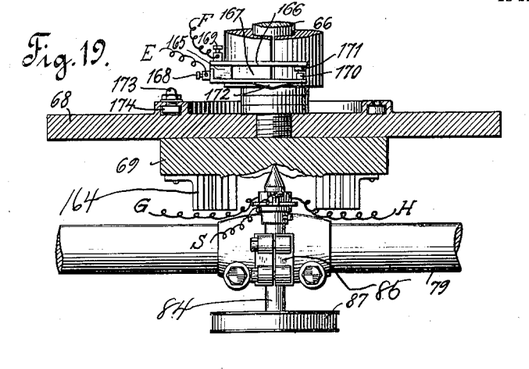
Figure 27:
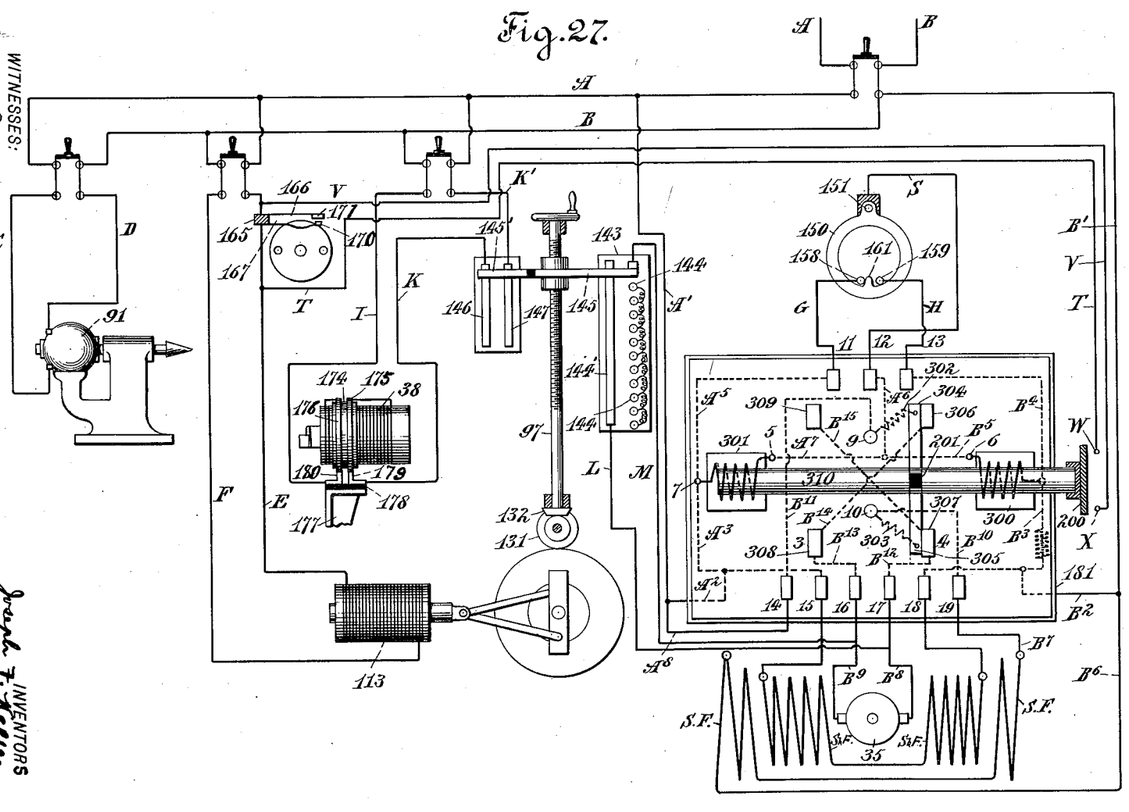
Fig. 27 is a diagrammatic view showing the several electric circuits.

For intermittingly exciting the solenoid 113, and thus causing the lowering of the free end of the rod or bar 79 and feeding the cutting tool and tracer across the faces of the pattern and work respectively, we secure to the cylindrical portion of the bracket or bearing 64 (Figs. 3 and 4) the block 165, which in turn has secured thereto the plates or conductors 167—166 provided with binding posts 168 and 169, (Figs. 3 and 19) the free forward ends of said plates or conductors having formed thereon or secured thereto the contact points 170—171 (Figs. 27 and 19). From the binding posts 168—169 lead the wires E—F to the main feed wires A and B, as illustrated in the diagrammatic view, Fig. 27, the solenoid 113 being in circuit.

The conducting plate 167 has formed on or secured thereto the cam 172, with which comes into contact the post 173 adjustably secured at the rear face of the pattern holder 168 as the latter rotates (Fig. 19), forcing the conducting plate 167 toward the plate 166, effecting an electrical contact between the points 170—171, thereby exciting the solenoid 113 and effecting a downward feed of the bar or rod 79 and its attached tracer and cutting tool at every rotation of the pattern holder 68. To effect a similar feed of the several parts when the pattern and die oscillate, in contradistinction to rotating, we lead branch wires or conductors T—V from the conductors F—E, (Fig. 27), terminating in the contacts W—X over and in contact with which travels a contacting plate 200 secured to but insulated from the core 201 of the pole-changing switch as the latter is operated to change the direction of travel of the motor and as said core is moved backwardly and forwardly. By this construction and arrangement of parts, it will be understood that as the direction of travel of the oscillating pattern is changed, (by the means hereinbefore described), the core 201 is caused to travel outwardly over, and to contact with, the points W—X, thereby completing the circuit through the branch wires or conductors T—V, through wires or conductors F—E, and the solenoid 113. The solenoid is thereby excited and effects a downward feed of the bar or rod 79. At the next change in the direction of travel of the oscillating pattern, the core 201 of the pole changing switch will be drawn inwardly, causing the contact plate 200 to be drawn by, over, and in contact with, the points W—X, causing or effecting in the same way, another feed of the bar, so that at the end of each oscillation of the pattern, and at the time of changing the direction thereof, the free end of the bar 79 is slightly lowered.

After the bracket 103 has been lowered so that the tracer and cutting tool have traveled from the centers of the pattern and die to the outer peripheries thereof, and the die completed, said bracket and rod 79 supported thereon, may be quickly returned to their normal positions by revolving the hand wheel 99.

As before described, it is desirable to decrease the rate of speed at which the pattern and die rotate or oscillate as the die nears completion, or in other words, as the tracer and cutting tool are gradually fed across the faces of the pattern and die respectively, from the centers toward the peripheries. In order to gradually decrease the speed thereof, in accordance with the gradual feed of the tracer and cutting tool, we secure to the bracket 94, a rheostat 143, of any desired construction and arrangement and preferably provided with a vertical row of contact points 144, to which are connected in the usual way, a series of resistances. To the sliding bracket 103 is secured an arm 145, which as said bracket 103 is gradually fed downwardly by means hereinbefore described, contacts with the points 144 and conducting rod $144^1$ connected to the rheostat, thereby gradually cutting in a greater resistance and slowing down the speed of the motor 35, which as before described drives the shaft 34, which in turn rotates or oscillates the pattern and die.

On the rheostat 143 are the conducting rods or tracks 146—147, electrically connected with the magnet 38, as will be hereinafter described, and with which rods or tracks 146—147 contacts the insulated end $145^1$ of the arm 145, completing the circuit through said tracks and retaining said magnet in its excited condition until the sliding bracket 103 is lowered to such a point that the end $145^1$ of the said arm 145 passes below the lower ends of said tracks. At such time the circuit is broken between the rods or tracks 146—147, and the magnet 38 electrically connected therewith becomes passive, thereby throwing into operation the slow train of gears hereinbefore referred to. At this point the resistance in the rheostat may be such as to again allow the motor 35 to speed up, the speed of the slow train of gears being sufficiently slow to allow of the greater speed of the motor, the remainder of the series of resistance being such as to gradually decrease the speed of the motor until the sliding bracket reaches its lowermost point, that is, at the time of the completion of the die. For example the speed of the motor in starting to cut the die may be 2500 revolutions per minute, which as the resistance is gradually cut in, may be reduced to 500 at the point where the end 145¹ of the arm 145 leaves the conducting tracks 146—147, at which time as before described, the magnet 38 becomes passive and the slow train of gears is thrown into operation. At this point the motor again speeds up to say about 2200 revolutions, but as the power is transmitted through the slow train of gears, the rate of speed at which the pattern and die oscillate is about the same or a trifle slower than at the time just prior to throwing said slow train of gears into operation. As the resistance is gradually cut in from this time, the speed of the motor is decreased from 2200 down to about 500, thereby decreasing the speed of the shaft 34 at a ratio of twenty-five to one, at which time, of course, the tracer will have reached the outer periphery of the pattern, and the die completed.

Figure 15:
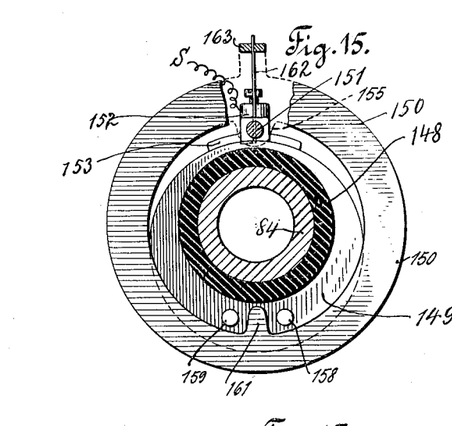
Figure 16:
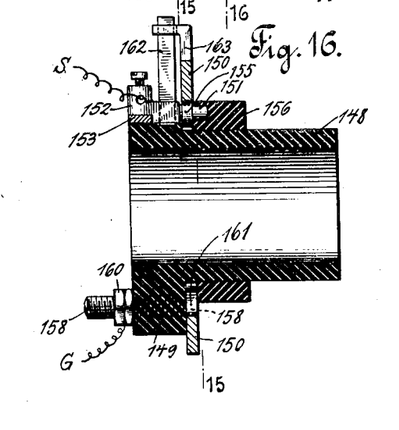
Figure 17:
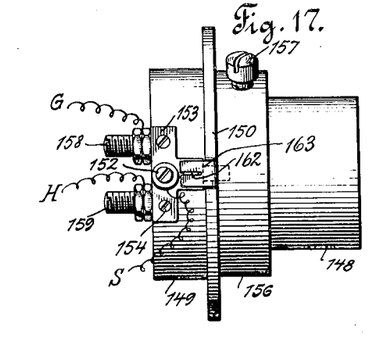
Figure 18:
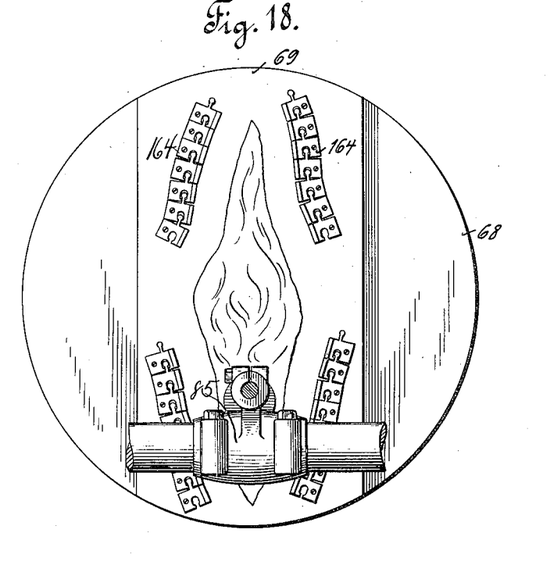

By reference to Figs. 6 and 27, it will be seen that on the outer side or surface of the magnet 38, is secured a ring of insulating material 174, to which latter are electrically connected the terminals of the coil of the magnet 38. To the frame or bed of the machine is secured the bracket 177 adapted to support on its upper end a block of insulating material 178, which insulating material has secured thereto the contacts or brushes 179—180 contacting with the rings 175—176 respectively, and from which brush 179 leads the wire or conductor K to the conducting rod or track 146, and from which brush 180 leads the wire or conductor I to the main feed wire B, the conducting rod or track 147 being connected to the main feed wire A by the wire K¹, the circuit being thus completed through the wire or conductor A, conductor K¹, track 147, arm 145¹, track 146, conductor K, magnet 38, conductor I and main feed B. When, however, the arm 145¹ is fed below the tracks 146—147, the circuit will be broken, whereupon the magnet 38 will become passive, as before described. As is the case with machines of like character, the present one is adapted and arranged to rotate the pattern and die blank at the commencement of the operation of cutting the latter, but to subsequently oscillate the same in order that the tracer may be kept in contact with and travel over the figured surface of the model or pattern from one side or boundary thereof to the other, and thereby save the time which would necessarily be consumed in traveling over the plain surface of the pattern should the latter be caused to rotate. To accomplish this purpose, we employ mechanism whereby when the pattern has oscillated to one side, so as to bring the boundary of the pattern opposite to the rotating tracer, the direction of travel or rotation of said pattern and die will be automatically changed, thus causing the pattern and die to travel in an opposite direction until the opposite boundary of said pattern has been brought opposite the tracing tool, whereupon the direction of travel of said pattern and die will again be changed, and so on until the tracer has been fed to the outer periphery of said pattern. The pattern and work are then reversed on their respective holders and the second half of the die completed in a manner similar to the first half. This reversing mechanism is constructed and arranged as follows:—On the sleeve 84 in which the spindle of the tracing tool rotates, is mounted a sleeve 148 provided with a flange 149, the lower portion of which is somewhat widened in order to receive binding screws, as hereinafter described, said sleeve being made of hard rubber, or other insulating material. Around this sleeve 148 is fitted a metal ring 150 supported by means of a post or pivot 151 formed on the back of the binding post 152, the latter in its turn being provided with a plate 153 secured by means of the screws 154 to the flange 149 formed on said sleeve 148. On the metal ring is formed a lug or projection 155 provided with a central opening through which passes the post or pivot 151, thereby allowing said metal ring a slight lateral movement or oscillation on said sleeve, a collar 156 being also fitted on the sleeve 148 and secured thereto by means of the screw 157, whereby to prevent the metal ring 150 from moving lengthwise on the collar 148. Through the lower widened portion of the flange 149 pass two screws 158—159, the rear ends of which project through said flange, and into the opening of the ring 150, the forward ends of said screws being provided with the lock nuts 160 for securing thereto the wires or conductors G, H, leading to a current reverser or pole-changing switch 181, shown in the diagrammatic view, Fig. 27. This pole-changing switch or current reverser is of course electrically connected with the motor 35, and may be of any suitable kind, style or pattern, that shown in the diagram being of the usual type. The inner edge of the ring 150 is provided with a lug or projection 161, (Fig. 15), which when the machine is at rest extends upwardly between the inner ends of the screws 158, but which when said metal ring 150 swings or oscillates on the pivot 151, will strike one of said posts 158 or 159 and form an electrical contact therewith. From the binding post 152 also leads a shunt wire or conductor S, said post being electrically connected with the ring 150, by means of the thin metal strip 162, the lower end of which is fitted in a projection formed on the back of said post, and the upper end fitted in the slot in the lug or projection 163 formed on the upper outer edge of said ring 150.

From the foregoing it will be understood that the mechanism thus described practically forms an electric switch, the metal ring 150 when swung on its pivot in one direction forming an electric contact with the post or screw 158 through the lug 161, and when swung in the opposite direction, forming an electric contact with the screw or post 159. To operate this switch, we secure to the pattern or templet a sectional stop 164, made of any desired material, but preferably metal in the form of a flexible chain, in order that said stop may be arranged to conform to the outline of the templet or pattern, that portion of the stop opposite the center of the pattern, however, being removed, as when the tracer is following such portion of the pattern, the latter is permitted to rotate and not to oscillate, as before described. As the pattern oscillates, and the tracer leaves the pattern it will be understood that the ring 150 will come in contact with the stop 164 on one side of the pattern, thereby swinging said ring on its pivot until the lug or projection 161 comes in contact with say the screw or post 158. When the parts are in this position, that is, the lug 161 in contact with the post 158, the current will flow through the wire B from the source of supply, through wires B¹, B², B³, solenoid coil 300, wires B⁵, A⁶, S, ring 150, post 158, wires G, A⁵, A³, A², A¹, back to the line A, thus short circuiting or shunting the current around the coil 301, leaving it passive while the coil 300 is rendered active, causing the core 310 to be drawn into the coil 300, thereby bringing the insulated bars 304 and 305, which are attached to core 310, into contact with points 306 and 307; the current will flow through the motor through wire B from the source of supply, wires B¹, B⁶, through series fields S. F. S. F., wires B⁷, B¹⁰, flexible wire 303, insulated bar 305 and contact 307, wires B¹², B⁸, to the armature 35, wires B⁹, B¹³, B¹⁴, contact 306, insulated bar 304, flexible wire 302, wires B¹¹, A⁸, A¹ to line A, causing the motor 35 to rotate the shaft 34 in a certain direction opposite to that in which it was formerly turning, and causing a change in the direction of travel or rotation of the pattern and work. The pattern and work now rotate in this said opposite direction until the tracer leaves the pattern and the ring 150 comes in contact with the stop 164 on the opposite side of said pattern; whereupon said ring 150 is swung or moved until the lug 161 comes in contact with the screw or post 159; the current will now flow as follows:—Wire B from source of supply, wires B¹, B², B³, B⁴, H post 159, ring 150, wires S, A⁶, A⁷, solenoid coil 301, wires A³, A², A¹ to line A, thus shunting the current around solenoid coil 300 leaving it passive and rendering the coil 301 active, and pulling the core 310 with the insulated conductor bars 304 and 305 into contact with points 308 and 309. The current will then flow through the motor as follows:—Wire B from the source of supply, wires B¹, B⁶, S. F. S. F., B⁷, B¹⁰, flexible wire 303, conductor 305, contact 308, wires B¹³, B⁹, armature 35, wires B⁸, B¹², contact 307, wire B¹⁵, contact 309, conductor 304, flexible wire 302, wires B¹¹, A⁸, A¹ to line A, thereby causing the motor 35 to reverse, and which reversal causes a reversal in the direction of rotation of the shaft 34, and which in turn changes the direction of rotation of the pattern and work. In other words, we have provided upon the tracer an electric switch, operated by means of a stop or stops secured to the templet or pattern, and which latter oscillating as it does, causes the stops on either side to automatically throw the switch, reversing the motor which drives the shaft, and which in turn imparts its movement to the pattern and work.

Having fully described our invention, what we claim as new and desire to secure by Letters Patent, is:—

1. In a machine of the character described, the combination with operating mechanism for rotating the pattern and work, of a tracer, a driving electric motor, a current reverser for said motor, and means arranged adjacent to the pattern for automatically actuating the reverser, substantially as described.

2. In a machine of the character described, the combination with the pattern and work holders and mechanism for rotating the same, of a tracer, a driving electric motor, a current reverser for the same, a switch controlling said reverser, and means moving with said pattern for actuating said switch automatically when the tracer leaves the pattern, substantially as described.

3. A machine of the character described, comprising an oscillating pattern, a driving electric motor for the same, a tracer, a current reverser, a switch controlling said reverser and means moving with said pattern for actuating the switch automatically when the tracer leaves the pattern, substantially as described.

4. A machine of the character described, comprising an oscillating work holder, a movable cutter, an oscillating pattern, a tracer, a driving electric motor for operating the work and pattern, and means arranged adjacent to the pattern connected to and moving with said pattern for reversing the latter, substantially as described.

5. A machine of the character described comprising an oscillating work holder, a movable cutter, a pattern, and means for automatically varying the arc through which the work holder moves relatively to the cutter to conform to the contour of the pattern, substantially as described.

6. The combination with a bed or frame, of pattern and work holders mounted thereon, an electric motor for simultaneously turning said holders, and mechanism connected with said motor and engaging with one of said holders whereby when said holders are turned to a predetermined extent, the direction of travel of said motor and holders is automatically changed, substantially as described.

7. The combination with a bed or frame, of pattern and work holders mounted thereon, an electric motor for simultaneously turning said holders, a tracer and cutting tool mounted in front of said holders, a switch mounted on said tracer and connected with said motor, and mechanism mounted on one of said holders and operating said switch, whereby when the holders are turned, the direction of travel of said motor and holders is automatically changed, substantially as described.

8. The combination with a bed or frame, of pattern and work holders mounted thereon, an electric motor for simultaneously turning said holders, a tracer and a cutting tool mounted in front of said pattern and work holders respectively, an electric switch carried by said tracer and connected with said motor, and means moving with one of said holders and adapted to engage and operate said switch, whereby when said holders are turned, the direction of travel of said motor and said holders is automatically changed, substantially as described.

9. The combination with a bed or frame, of pattern and work holders mounted thereon, an electric motor for simultaneously turning said holders and having a pole changing switch connected therewith, and mechanism connected with one of said holders and operating said switch, whereby to automatically change the direction of the travel of said motor and said holders, substantially as described.

10. The combination with a bed or frame, of pattern and work holders mounted thereon, a tracer and cutting tool mounted in front of said holders, an electric motor connected with said holders for simultaneously turning the same, a pole changing switch, and mechanism connected with said tracer and pattern holder, and operating said switch, whereby to automatically change the direction of travel of said motor and said holders, substantially as described.

11. The combination with a bed or frame, of pattern and work holders mounted thereon, a tracer and cutting tool mounted in front of said pattern and work holders respectively, an electric motor connected with said holders for simultaneously rotating the same, and having a pole changing switch connected thereto, an electric switch carried by said tracer and electrically connected with said pole changing switch, and a stop or stops carried by said pattern holder for operating the switch on the tracer, whereby the direction of travel of said motor and holders is automatically changed, substantially as described.

12. The combination with a bed or frame, of oscillating pattern and work holders mounted thereon, a shaft mounted on said frame and geared to said holders and adapted to simultaneously turn the latter, fast and slow gears connected with said shaft, a variable speed motor connected with said gears on said shaft, and means for automatically throwing said gears into and out of operative engagement with said shaft, substantially as described.

13. In a machine of the character described, the combination with oscillating pattern and work holders, of a shaft geared thereto and adapted to simultaneously turn the same, a bar pivoted to the machine and adapted to be fed downwardly at one end, a tracer and cutting tool mounted on said bar in front of said pattern and work holders respectively, fast and slow gears mounted on said shaft, a motor engaging said gears, and means connected with said pivoted bar for automatically throwing out of operative engagement the fast gear on said shaft, and throwing into operative engagement the slow gear on said shaft, substantially as described.

14. In a machine of the character described, the combination with pattern and work holders, of a shaft geared to said holders and adapted to turn the same, a bar pivoted to the machine, a tracer and cutting tool mounted on said pivoted bar in front of said holders respectively, a motor connected to said shaft by fast and slow gears, a magnet for holding said fast gear in operative engagement with said shaft, means connected with the free end of said pivoted bar for breaking the circuit through said magnet when said bar is lowered, and mechanism for automatically throwing said slow gear into operative engagement with the shaft when the bar is lowered and the circuit through said magnet thereby broken, substantially as described.

15. In a machine of the character described, the combination with pattern and work holders, of a shaft geared thereto and adapted to simultaneously turn the same, of gears mounted on the shaft and engaging with a motor, whereby said shaft is driven, a bar pivoted to the machine and carrying a tracer and cutting tool, and mechanism connected to said bar for automatically throwing into and out of operative engagement the said gears on said shaft whereby the speed of said shaft is automatically decreased as the end of said bar is lowered, substantially as described.

16. In a machine of the character described, the combination with a bed or frame, a work holder adjustably mounted on said frame, a bar pivoted to the machine and carrying a cutting tool in front of said work holder, feed mechanism for lowering the free end of said bar, and means connected with said feed mechanism and adjustable with said work holder whereby the feed or lowering of said bar is regulated, substantially as described.

17. In a machine of the character described, the combination with a bed or frame, a work holder adjustably mounted on said frame, a bar pivoted to the machine and carrying a cutting tool in front of said work holder, feed mechanism for moving the free end of said bar, and means connected with said feed mechanism and with said work holder, whereby the said feed is simultaneously adjusted with said work holder, substantially as described.

18. In a machine of the character described, the combination with a bed or frame, of pattern and work holders mounted thereon, means for simultaneously turning said holders, a bar pivoted to the frame and having mounted thereon a tracer and cutting tool in front of said pattern and work holders respectively, feeding mechanism connected with and adapted to move the free end of said bar, a solenoid connected to and operating said feed mechanism, and means connecting one of said holders with said solenoid for making and breaking the circuit through the latter, whereby said solenoid operates the feeding mechanism as said holder is turned, substantially as described.

19. In a machine of the character described, the combination with a bed or frame, of pattern and work holders mounted thereon, means for simultaneously turning the same, a bar pivoted to the machine and having attached thereto a tracer and cutting tool in front of said pattern and work holders respectively, feeding mechanism connected with the free end of said bar for lowering the same, a solenoid connected with and adapted to operate said feeding mechanism, and an electric switch connected to said solenoid and operated by one of said turning holders for making and breaking the circuit through said solenoid and intermittingly operating said feeding mechanism, substantially as described.

20. The combination with a bed or frame, of a pattern holder mounted thereon, means for turning the same, a bar pivoted at one end to the machine and carrying a tracing tool in front of said pattern holder, feeding mechanism connected with the free end of said bar and adapted to lower the same, a solenoid connected to and operating said feeding mechanism, an electric contact connected with said solenoid and operated by said pattern holder, whereby said solenoid operates the feeding mechanism to lower the free end of said bar as the pattern holder turns, substantially as described.

21. In a machine of the character described, the combination with a frame or bed, of a work holder adjustably mounted thereon, a bar pivoted at one end to the machine and carrying a cutting tool in front of said work holder, feeding mechanism connected to and adapted to lower the free end of said bar, and a cam engaging said feed mechanism and adapted to regulate the same, said cam being connected with and turned by the adjustable work holder, substantially as described.

22. The combination with a bed or frame, of pattern and work holders mounted thereon, an electric motor for simultaneously turning said holders, a tracer and a cutting tool mounted in front of said holders, a switch connected with said motor, and mechanism connected with one of said holders and operating said switch, whereby when the holders are turned to a predetermined extent, the direction of travel of said motor and holders is automatically changed, substantially as described.

23. The combination with a bed or frame, of pattern and work holders mounted thereon, an electric motor for simultaneously turning said holders, a tracer and a cutting tool mounted in front of said holders, a switch connected with said motor, and mechanism mounted on one of said holders and operating said switch, whereby when the holders are turned to a predetermined extent the direction of travel of said motor and holders is automatically changed, substantially as described.

24. The combination with a bed or frame, of pattern and work holders mounted thereon, a tracer and a cutting tool mounted in front of said pattern and work holders, respectively, an electric motor connected with said holders for simultaneously rotating the same, and having a pole changing switch connected thereto, an electric switch connected with said pole changing switch, and means carried by said pattern holder for operating said electric switch, whereby the direction of travel of said motor and holders is automatically changed, substantially as described.

25. A machine of the character described comprising a rotating pattern, a tracer, electric devices for reversing the pattern, and means arranged adjacent to the pattern for automatically operating said electric device, substantially as described.

26. A machine of the character described, comprising an oscillating work-holder, a movable cutter, an oscillating pattern, a tracer and means for automatically reversing the movement of the work-holder and pattern when the tracer leaves the latter, said means including electrical devices.

27. A machine of the character described, comprising an oscillating work-holder, a movable cutter, an oscillating pattern, a tracer and means for automatically reversing the movement of the work-holder and pattern when the tracer leaves the latter, said means including an electrical governing portion.

Signed at New York, borough of Manhattan, in the county of New York and State of New York, this 2nd day of November, A. D. 1904.

JOSEPH F. KELLER.
WILLIAM A. WARMAN.

Witnesses:
LILLIAN AUSTIE,
EMMA M. FOWLER.